United States Patent [19]
Short et al.

[11] 3,898,204

[45] Aug. 5, 1975

[54] PRODUCTION OF FIBERS FROM PHENYLENE SULFIDE POLYMERS

[75] Inventors: James N. Short, Bartlesville, Okla.; Lee O. Edmonds, deceased, late of Bartlesville, Okla., by Emmilou Edmonds, executrix; James T. Edmonds, Jr., Bartlesville, Okla.

[73] Assignee: Phillips Petroleum Company, Bartlesville, Okla.

[22] Filed: Apr. 8, 1974

[21] Appl. No.: 458,702

Related U.S. Application Data

[60] Continuation-in-part of Ser. No. 354,981, April 27, 1973, abandoned, which is a division of Ser. No. 237,881, March 24, 1972, abandoned.

[52] U.S. Cl. .................. 260/79; 57/140; 66/202; 139/420; 161/169; 161/174; 260/79.1; 264/236; 264/347

[51] Int. Cl. ........................................... C08g 23/00
[58] Field of Search ............ 260/79, 79.1; 264/236, 264/347

[56] References Cited
UNITED STATES PATENTS
3,725,362    4/1973    Walker ............................... 260/79

*Primary Examiner*—Melvyn I. Marquis

[57] ABSTRACT

Strong, high modulus, high-melting, non-burning fibers are formed from aromatic sulfide polymers, such as phenylene sulfide polymers, by melt spinning an aromatic sulfide polymer having a melt flow in the range of from 75 to 800 followed by drawing the fibers in the molten state, cooling the fibers, and, optionally, drawing the cooled fibers in the solid state.

8 Claims, No Drawings

PRODUCTION OF FIBERS FROM PHENYLENE SULFIDE POLYMERS

This is a continuation-in-part application of our co-pending application having Ser. No. 354,981, filed Apr. 27, 1973, which in turn is a divisional application of our application having Ser. No. 237,881, filed Mar. 24, 1972, both now abandoned.

This invention relates to the production of fibers from aromatic sulfide polymers. In accordance with another aspect, this invention relates to a process for producing strong, high modulus, non-burning fibers from phenylene sulfide polymers by melt spinning, drawing the melt-spun filaments in the molten state, cooling the filaments, and, optionally, drawing the filaments in the solid state. In accordance with a further aspect, this invention relates to the formation of strong, high modulus, high-melting, non-burning fibers from phenylene sulfide polymers by partially curing the polymers by heating the polymers at an elevated temperature and for a period of time sufficient to increase the molecular weight of the polymers (reduce melt flow) prior to melt spinning. In accordance with another aspect, phenylene sulfide polymers are oxidatively cured to increase the molecular weight (reduce melt flow) prior to melt spinning followed by drawing of the melt-spun filaments in the molten state, cooling the filaments, and finally drawing the filaments in the solid state to produce strong, high-modulus, high-melting, non-burning fibers which can be formed into various articles of manufacture.

Articles made from the fibers of the invention possess many desirable properties because of the strength, high melting point and non-burning characteristics of the fibers. The articles and fibers from which they are made are also attractive for use in corrosive atmospheres and applications because the polymers from which the fibers are made are highly resistant to most chemicals including commonly used acids and bases. The fibers can be formed into yarn and fabrics formed from the yarn by knitting, weaving or other known means for producing fabrics including non-woven fabrics.

Aromatic sulfide polymers such as phenylene sulfide polymers ranging in consistency from viscous liquids to crystalline solids are known. While such polymers exhibit desirable properties for many applications such as coating compositions, the unmodified polymers normally possess relatively high melt flow, that is, above 4,000, as measured in grams per 10 minutes by ASTM method D—1238—70 modified for operation at 650°F (343°C) with a 5 kg weight. This high melt flow inhibits the use of the polymers in the production of fibers. Since most of the polymers possess the very desirable properties of high melting points [285°C for poly(phenylene sulfide)] and are non-burning, it is desirable to modify the polymers to permit their conversion into fibers. The present invention is directed to a process for the production of strong, high-modulus, high-melting, non-burning fibers from modified phenylene sulfide polymers and the resulting fiber product.

In accordance with the invention, it has been found that aromatic sulfide polymers such as phenylene sulfide polymers can be melt spun into fibers with highly desirable properties if the polymers are at least partially cured before melt spinning in order to reduce the melt flow of the polymers to a prescribed range.

Accordingly, an object of this invention is to improve the processing characteristics of aromatic sulfide resins such as phenylene sulfide polymers.

Another object of this invention is to provide a process for the production of fibers from phenylene sulfide polymers.

A further object of this invention is to provide strong, high-modulus, high-melting, non-burning fibers from phenylene sulfide polymers.

Another object of this invention is to provide fibers from phenylene sulfide polymers having desirable properties that can be formed into articles of manufacture such as fabrics, yarn, etc.

A further object of this invention is to provide an improved method for the production of strong, high-modulus, high-melting, non-burning fibers from phenylene sulfide polymers. For purposes of this disclosure, the words "filaments" and "fibers" are used interchangeably to indicate an indeterminate length of polymer extrudate suitable for textile manufacture.

In accordance with the invention, strong, high-modulus, high-melting, non-burning fibers are produced from aromatic sulfide polymers such as phenylene sulfide polymers by melt spinning a polymer which has been partially cured to a melt flow in the range of 75 to 800 and then drawing the melt-spun filaments in the molten state. The melt-drawn fibers can be additionally improved by drawing in the solid state after cooling.

The resulting fibers formed according to the invention have a very high melting point [285°C for poly(phenylene sulfide)], are non-burning as they have an LOI (Limiting Oxygen Index) of 35 (will not burn in an atmosphere containing less than 35 volume percent oxygen), and are highly resistant to chemical attack. Fabrics made from these fibers are especially suitable for high-temperature applications such as industrial filter bags, for non-burning applications such as draperies, upholstery, wall coverings, clothing, etc., and for other applications where the special properties of the fibers are desired.

More specifically, in accordance with one embodiment of the invention, a process is provided for the production of strong, high-modulus, high-melting, non-burning fibers from phenylene sulfide polymers by heating such polymers having an inherent viscosity of 0.15 to 0.25 at an elevated temperature for a period of time sufficient to at least partially cure the polymer and thus produce a polymer with a melt flow in the range of 75 to 800, and then melt spinning the partially cured polymer through spinneret orifices having diameters in the range of 5 to 25 mils, followed by drawing the thus melt-spun filaments while still in the molten state at least tenfold, that is, the linear speed at which the filaments are wound on take-up rolls is ten times the linear velocity of the molten polymer through the spinneret orifices. It is also possible, of course, to extrude larger filaments through orifices of 40 mils or greater diameter in order to make fibers for bristles, cordage, etc.

In accordance with another embodiment of the invention, melt-spun, strong, high-modulus, high-melting, non-burning fibers of phenylene sulfide polymers are formed from at least partially cured phenylene sulfide polymers having a melt flow of 75 to 800.

In accordance with still another embodiment of the invention, the melt-spun fibers of at least partially cured phenylene sulfide polymers having a melt flow of 75 to 800, which are preferably drawn in the solid state subsequent to melt spinning, are formed into various articles of manufacture such as yarn, fabrics, and the like.

The term "phenylene sulfide polymer" as used in this specification is intended to include polymers of the type which are prepared as described in U.S. Pat. No. 3,354,129, issued Nov. 21, 1967, to Edmonds and Hill, and which can be at least partially cured to obtain polymers with a melt flow of 75 to 800. Melt flow of these polymers is measured by ASTM method D—1238—70 modified for operation at 650°F with a piston load of 5 kilograms. As disclosed in the Edmonds and Hill patent, these polymers can be prepared by reacting a polyhalo-substituted aromatic compound containing unsaturation between adjacent ring atoms and a mixture in which at least one alkali metal sulfide is contacted with at least one organic amide. The resulting polymer contains the aromatic structure of the polyhalo-substituted aromatic compound coupled in repeating units through a sulfur atom. The polymers which are preferred for use in this invention, because of their high thermal stability and availability of raw materials, are those polymers having the repeating unit —R—S— where R is phenylene or a lower alkyl-substituted derivative thereof. By "lower alkyl" is meant alkyl groups having 1 to 6 carbon atoms such as methyl, propyl, isobutyl, n-hexyl, and the like. Thus, the term "phenylene sulfide polymers" is intended to include not only the phenylene group but also the lower alkyl substituted phenylene groups. The preparation of such polymers is well disclosed in the above-mentioned patent of Edmonds et al. In a presently preferred embodiment, poly(phenylene sulfide) is prepared by reacting p-dichlorobenzene with a mixture in which sodium sulfide is contacted with N-methyl-2-pyrrolidone as described in Example I in the Edmonds and Hill patent. Other polymers prepared as described in the Edmonds and Hill patent are suitable for preparation of the fibers of our invention providing the polymers can be cured to a melt flow in the 75 to 800 range.

The preferred polymers for use in our invention are those having melting-point temperatures above about 200°C. The preferred phenylene sulfide polymers can have melting-point temperatures in the range from about 200°C (392°F) to about 330°C (626°F). Polymers of phenylene sulfide usually have melting points in the range from about 250°C (482°F) to 300°C (572°F). However, it is believed that other aromatic sulfide polymers such as phenylene sulfide polymers having higher melting temperatures ranging up to about 500°C can be satisfactorily melt spun into fibers according to the invention. In the event that polymers having melting temperatures above about 325°C are used, a modified melt flow evaluation procedure would need to be developed as the ASTM method D—1238—70, as presently modified, is capable of measuring the melt flow properties of polymers having melting temperatures below 650°F (343°C).

The preferred polymers before curing have an inherent viscosity as measured in 1-chloronaphthalene at 206°C at a polymer concentration of 0.4 g/100 ml solution of at least 0.15, more preferably between 0.15 and 0.25, and in some instances between 0.18 and 0.22. Melt flow of the polymers before curing is usually above 4,000, much too high for preparation of suitable fibers. After curing, it is difficult, if not possible, to measure inherent viscosity of the polymer because of its very high molecular weight. We, therefore, use melt flow as a more reliable measure of the suitability of the polymer for the preparation of fibers.

In accordance with the invention, a virgin phenylene sulfide polymer having a melt flow of 800 or higher is heated at an elevated temperature for a period of time sufficient to at least partially cure the polymer and reduce its melt flow into the acceptable range of 75 to 800. The virgin polymers are partially cured by heat treating in the absence of oxygen or with an oxidizing agent, either under vacuum or at atmospheric or superatmospheric pressure, to increase the molecular weight by either a lengthening of a molecular chain or by crosslinking or by a combination of both to improve such properties as tensile strength. Such treatment can be effected, for example, by heating the polymer preferably to an elevated temperature, either above or below the melting point of the polymer in some cases as high as 250°C (482°F) to 500°C (932°F). Such heat treatment can be carried out while contacting the polymer with air or under vacuum or under an inert gas such as nitrogen. It has been found advantageous to effect the curing of the polymer by contacting the polymer with air at a temperature slightly below the melting point of the polymer.

The melting point of phenylene sulfide polymers can be readily determined by differential thermal analysis (DTA) by heating a 10 mg sample of the polymer at a rate of 10°C per minute. The melting point of the polymer is taken from the DTA thermogram in a conventional manner. The temperature at which the polymer is cured will vary within the range of about 100° to about 400°C, depending upon the molecular weight and melting point of the polymer. Generally, the curing temperature will be in the range of from about 25°F (13.9°C) to about 125°F (68.5°C), preferably from about 50°F (27.8°C) to about 100°F (55.5°C) below the melting point of the polymer being treated. The time required for the curing treatment will be sufficient to reduce the melt flow into the acceptable range and, depending on the melt flow of the virgin polymer, will range from a few minutes to 15 hours or as long as several days. The curing time required is usually only a few hours. The preferred time for poly(phenylene sulfide), for example, is 2 to 8 hours at a temperature ranging from about 50°F (27.8°C) to about 100°F (55.5°C) below the melting point of the polymer: the closer the treating temperature is to the melting point of the polymer, the shorter the treating time required.

As indicated above, the curing or heating treatment is preferably carried out in the presence of an oxygen-containing gaseous oxidizing atmosphere such as air. The oxidizing gas rate with respect to contacting of the particulate polymer will vary appreciably, depending upon the type of apparatus employed for carrying out the oxidative curing. If desired, the air can be preheated prior to contacting with the particulate polymer.

The curing or heating treatment can be carried out in conventional equipment for the contacting of particulate solids with hot gases. A convenient method is to contact the particulate polymer with air in a fluidized-solids contactor using air as both the fluidization and curing medium. The operation may be batch or continuous with batch preferred. Samples can be withdrawn periodically for measurement of melt flow to determine when curing is complete.

As indicated previously, following the reduction in melt flow of the polymer to the 75 to 800 range by heating, the polymer is then melt extruded using conventional polymer melt spinning equipment by passing molten polymer through spinneret orifices of 5 to 40 mils diameter. The melt spinning is carried out at an elevated temperature of about 25° to about 100°C above the melting point of the polymer. The melt spinning is often carried out at about 600°F (316°C). The molten filaments are drawn from the spinneret orifices by means of take-up rolls at a linear rate at least 10 times the linear extrusion rate; this reduces the diameter of the filaments proportionally. The melt-drawn filaments are then cooled to approximately room temperature by air contacting (commonly called air quenching) or by passage through a water bath. The now solid-state-filaments are then drawn again, this time in the solid state, at atmospheric or elevated temperature considerably below the melting point, in order to orient the polymer molecules and thus produce strong fibers. Draw ratios during the solid-state drawing step range from about 3 to about 8 times, preferably from 3 to 6 times, their original length. This is accomplished by operating the take-up rolls at 3 to 6 times the speed of the feed rolls. Between the two rolls the filaments can be heated as by passage around a heated pin, over a heated plate, by passage through a heated liquid, etc.

EXAMPLE I

Phenylene sulfide polymer as produced by Example I in U.S. Pat. No. 3,354,129 was used to produce fibers according to our invention. The polymer initially had a melt flow in excess of 2,000 grams per 10 minutes as measured by ASTM—D—1238—70 modified to operate at 650°F with a piston load of 5 kilograms. Inherent viscosity of the initial polymer was 0.22 as measured in 1-chloronaphthalene at 206°C at a polymer concentration of 0.4 grams per 100 ml solution.

The polymer was partially cured by heating with air at 500°F (260°C) with samples removed from the curing contactor after 1, 2 and 3 hours in order to obtain samples with melt flows reduced to decreasing values.

The polymer samples were melt spun into filaments using an Instron Rheometer containing a single orifice with a diameter of 20 mils and a length of 176 mils. The polymer was extruded at a temperature of 290° to 310°C at a rate of 1 ml per minute. The molten filaments were hand pulled from the orifice at a rate at least 10 times the extrusion rate, passed through a water bath for quenching, and then drawn in the solid state at a draw ratio of 4 by hand pulling over a hot plate.

A summary of the results is presented below in Table I:

Table I

| Sample No. | Hours Cured at 500°F | Polymer Melt Flow | Fiber Properties |
|---|---|---|---|
| 1 | 0 | 2,000 | Extrudate was brittle and could not be drawn without breaking. |
| 2 | 1 | 390 | Somewhat better than Sample 1 but could only be drawn to short lengths before breaking. |
| 3 | 2 | 114 | Extrudate could be drawn at least 10 times in molten state and 4 times in solid state without breaking. |
| 4 | 3 | 61 | Better fibers than Sample 2 but not as good as Sample 3. |

Properties of the fibers obtained from Sample 3 in Table I were evaluated at various temperatures as tabulated below in Table II:

Table II

| Temp., °C | Breaking Strength, grams | Fiber Denier | Tenacity[a] gpd | Elongation at Break, % | Initial Modulus gpd |
|---|---|---|---|---|---|
| 25 | 518 | 193 | 2.68 | 12 | 67 |
| 50 | 442 | 193 | 2.29 | 16 | 45 |
| 75 | 531 | 193 | 2.75 | 21 | 40 |
| 100 | 382 | 197 | 1.94 | 28 | 26 |
| 125 | 415 | 197 | 2.10 | 33 | 17 |
| 150 | 400 | 197 | 2.02 | 32 | 11 |
| 200 | 228 | 193 | 1.20 | 31 | 6 |

[a]Tenacity obtained by dividing Breaking Strength by Denier.

Referring to the above data, it is seen that breaking strength and tenacity remain high up to a temperature of about 150°C (302°F) and are still acceptable at 200°C (392°F). This is very good stability for fibers at such high temperatures. The fibers are also non-burning with an LOI (Limited Oxygen Index) of 35 (will not burn in an atmosphere containing less than 35 volume percent oxygen).

EXAMPLE II

Poly(phenylene sulfide) with an inherent viscosity of 0.24 and cured to a melt flow of 32 could not be extruded smoothly into filaments and the extrudate could not be taken up on a roll. The melt flow of the polymer was too low for extruding the polymer into filaments.

EXAMPLE III

Poly(phenylene sulfide) having an inherent viscosity of 0.18 was partially cured at 288°C (550°F) for different periods of time to obtain polymer samples with melt flows varying from 154 to 771. These samples were melt spun into filaments by passage of the molten polymer through a conventional screen pack and spinneret orifice of 20 mils diameter under the conditions and with results tabulated below.

TABLE III

| Sample No. | Melt Flow Of Cured Polymer | Melt Spinning Temp., °C | Filament Take-up Speed, ft/min | Solid-State Drawing Ratio | Solid-State Drawing Temp., °C |
| --- | --- | --- | --- | --- | --- |
| 1 | 771 | 300 | 415 | 3 | 100[b] |
| 2 | 293 | 300 | 400 | 3 | 100[b] |
| 3 | 279 | 300 | 315[a] | 3 | 100[b] |
| 4 | 154 | 350 | Broke at 180 | — | — |

| | Denier Before Solid State Draw | Denier After Solid State Draw | Tenacity, g/denier | Elongation, % | Initial Modulus g/denier |
| --- | --- | --- | --- | --- | --- |
| 1 | 93 | 29 | 1.5 | 52 | 31 |
| 2 | 96 | 29 | 1.5 | 50 | 31 |
| 3 | 94 | 29 | 1.4 | 45 | 31 |

[a] Would not run at 415 ft/min.
[b] Could not be drawn three times at 150°C.

Properties of the fibers tabulated above are also very satisfactory for high-melting, non-burning polymers.

EXAMPLE IV

Poly(phenylene sulfide) with an inherent viscosity of 0.18 was partially cured to a melt flow of 390 and then melt spun at 310°C through a 6-orifice spinneret (orifice diameter of 9 mils) at 1 ml per minute. The filaments were drawn in the molten state at least ten times, air quenched, and taken up on a roll at a rate of 75 feet per minute. The six filaments were drawn in the solid state by passage over a hot plate at 150°C to 4 times their original length and then three-plied to form a 356-denier, 18-filament yarn. Yarn tenacity was 1.12 grams per denier; it had a 46% elongation at break and an initial modulus of 32 grams per denier.

EXAMPLE V

The yarn from Example IV was knitted on a Carolina Model Labknit-1 laboratory knitting machine, using a 3.5-inch-diameter cylinder with 220 needles. The fabric thus knitted had 26 wales per inch and 35 courses per inch. The knitted fabric was flexible and had good appearance and hand. It was chemically inert and non-burning (LOI of 35) suggesting suitability for filter cloths in high-temperature, corrosive applications, protective clothing, draperies, and upholstering in public buildings, etc.

We claim:

1. Melt-spun, high modulus, high-melting, non-burning phenylene sulfide polymer fibers formed from at least partially cured phenylene sulfide polymers having a melt flow within the range of 75 to 800 grams per 10 minutes as measured by ASTM method D—12-38—70 modified to operate at 650°F with a piston load of 5 kilograms.

2. Highly oriented, melt-spun fibers according to claim 1 which have been drawn in the solid state at least about 3 times to about 8 times to provide a high degree of orientation in said fibers.

3. Melt-spun fibers according to claim 1 wherein said phenylene sulfide polymer is poly(phenylene sulfide).

4. Melt-spun fibers according to claim 1 wherein said phenylene sulfide polymer is poly(phenylene sulfide) and said fibers have been drawn in the solid state at least about 3 to about 8 times to provide a high degree of orientation in said fibers.

5. Melt-spun fibers according to claim 1 wherein said phenylene sulfide polymer prior to curing had an inherent viscosity of 0.15 to 0.25.

6. Melt-spun fibers according to claim 5 wherein said phenylene sulfide polymer is poly(phenylene sulfide).

7. Highly oriented, melt-spun fibers according to claim 1 formed from a phenylene sulfide polymer having a melt flow of 100 to 500 which have been drawn in the solid state about 3 to about 6 times to produce a high degree of orientation in said fibers.

8. Melt-spun fibers according to claim 7 wherein said phenylene sulfide polymer is poly(phenylene sulfide).

* * * * *